US008865016B2

(12) United States Patent
Waidelich et al.

(10) Patent No.: US 8,865,016 B2
(45) Date of Patent: Oct. 21, 2014

(54) BIODEGRADABLE, FROST PROOF HEAT-TRANSFER FLUID, USE THEREOF IN NEAR-SURFACE GEOTHERMAL INSTALLATIONS, AND A CONCENTRATE FOR PREPARING SAME

(75) Inventors: Michael Waidelich, Burghausen (DE); Achim Stankowiak, Altoetting (DE); Johann Schuster, Kastl (DE); Martina Unterhaslberger, Neuoetting (DE); Sabine Dronia, Kastl (DE)

(73) Assignee: Clariant Finance (BVI) Limited, Tortola (VG)

( * ) Notice: Subject to any disclaimer, the term of this patent is extended or adjusted under 35 U.S.C. 154(b) by 3 days.

(21) Appl. No.: 13/581,886

(22) PCT Filed: Feb. 18, 2011

(86) PCT No.: PCT/EP2011/000790
§ 371 (c)(1),
(2), (4) Date: Aug. 30, 2012

(87) PCT Pub. No.: WO2011/107220
PCT Pub. Date: Sep. 9, 2011

(65) Prior Publication Data
US 2012/0319032 A1    Dec. 20, 2012

(30) Foreign Application Priority Data
Mar. 5, 2010   (DE) .................. 10 2010 010 408

(51) Int. Cl.
C09K 5/10 (2006.01)
C09K 5/20 (2006.01)
C23F 11/14 (2006.01)
C23F 11/12 (2006.01)

(52) U.S. Cl.
CPC ... *C09K 5/10* (2013.01); *C09K 5/20* (2013.01); *C23F 11/145* (2013.01); *C23F 11/141* (2013.01); *C23F 11/126* (2013.01)
USPC .................. 252/73; 252/74; 252/75; 252/76; 252/77

(58) Field of Classification Search
None
See application file for complete search history.

(56) References Cited

U.S. PATENT DOCUMENTS

| | | | | |
|---|---|---|---|---|
| 5,085,793 | A | * | 2/1992 | Burns et al. ..................... 252/79 |
| 5,785,895 | A | | 7/1998 | Martin et al. |
| 6,093,341 | A | | 7/2000 | Minks et al. |
| 7,060,199 | B2 | | 6/2006 | Woydt et al. |
| 7,241,391 | B1 | | 7/2007 | Miksic et al. |
| 7,588,695 | B2 | | 9/2009 | Wenderoth et al. |
| 2008/0315152 | A1 | * | 12/2008 | Daly ............................. 252/73 |

FOREIGN PATENT DOCUMENTS

| | | |
|---|---|---|
| DE | 19830493 | 3/2000 |
| DE | 10313280 | 10/2004 |
| EP | 0025011 | 3/1981 |

OTHER PUBLICATIONS

International Search Report for PCT/EP2011/000790 mailed Jun. 1, 2011.
International Preliminary Report on Patentability for PCT/EP2011/000790, Jun. 1, 2011.
English abstract of EP 0025011, Nov. 3, 1981.
Klotzbücher, et al., Geothermics 36 (2007), pp. 348-361.

* cited by examiner

*Primary Examiner* — Necholus Ogden, Jr.
(74) *Attorney, Agent, or Firm* — Tod A. Waldrop

(57) ABSTRACT

Biodegradable, frost proof heat-transfer fluid, use thereof in near-surface geothermal installations, and a concentrate: subject matter of the present invention is the use of a triazole-free composition which as well as water comprises a) 9.2% to 49.5% by weight of at least one $C_2$ to $C_3$ alkylene glycol, $C_2$ to $C_3$ polyalkylene glycol or glycerol, b) 0.1% to 4% by weight of at least one corrosion inhibitor, with the provisos that c) the composition is readily degradable biologically in accordance with test method OECD 301 A, d) the composition has an anaerobic biodegradability of at least 75% in accordance with test method OECD 311, e) the corrosion inhibitor or all corrosion inhibitors used are readily degradable biologically in accordance with OECD 301 A (for water-soluble corrosion inhibitors) or OECD 301 B (for corrosion inhibitors of low water-solubility), in near-surface geothermal installations as a heat-transfer fluid.

6 Claims, No Drawings

BIODEGRADABLE, FROST PROOF HEAT-TRANSFER FLUID, USE THEREOF IN NEAR-SURFACE GEOTHERMAL INSTALLATIONS, AND A CONCENTRATE FOR PREPARING SAME

The present invention relates to heat transfer fluids which are used in near-surface geothermal installations, which do not freeze at temperatures below the freezing point, which give reliable corrosion protection and which are readily biodegradable.

The number of near-surface geothermal installations is increasing, since they are an environmentally viable alternative for obtaining heat. This technology has now matured and in economic terms too is a good alternative to conventional systems which use oil, gas or other fossil fuels to obtain heat.

With the number of near-surface geothermal installations, there is also an increasing risk that leakage in the system will allow the heat transfer medium to get into the soil and cause environmental damage there. The glycols frequently used as a constituent of the heat transfer medium (ethylene glycol or propylene glycol) have good biodegradability, which has been shown in studies (Geothermics 36 (2007) 348-361). Good biodegradability shall be understood to mean degradabilities which have been determined by the OECD methods.

Without the addition of an antifreeze additive to the heat transfer fluid, for example a glycol, the efficiency of a near-surface geothermal installation is usually very limited, or deeper drilling subsequently has to take place in order to obtain the same heat input when water is part of the heat transfer fluid. The deeper bores into the soil are environmentally and economically dubious. Moreover, some of the new heat pumps which are used in this sector are so efficient that the temperature of the heat transfer medium, once the energy has been withdrawn therefrom in the heat pump, is below zero on entry into the soil, and hence an antifreeze is required.

However, the anticorrosion additives used are also coming more and more into the focus of environmental compatibility testing. In order to be able to ensure good and sufficient corrosion protection and impeccable operation of the system, it is necessary to add anticorrosion additives. Without these additives, the probability of leakage rises significantly, and corrosion products, for example metal ions, could get into the soil. The antifreeze additives used additionally increase the corrosion risk. The glycols frequently used, as a result of oxidation, form organic acids with time, and these have significant corrosion-promoting action.

According to the current prior art, there is regular use of anticorrosion additives of low biodegradability, for example benzotriazole. Even now, the latter is no longer permitted by the authorities in aircraft and runway deicing compositions, which can get into the environment to a relatively high degree.

Examples of other corrosion inhibitors used in ready-to-use heat transfer fluids are amines (often water pollutants or toxic to fish), the effects of which on the environment are also classified as harmful.

Biodegradable corrosion inhibitors are known, for example, from U.S. Pat. No. 5,785,895, where a biodegradable imidazole is described.

U.S. Pat. No. 7,060,199 describes a biodegradable functional fluid for mechanical drives, especially steam engines.

DE-A-198 30 493 describes a heat transfer for solar installations, which comprises glycols and corrosion inhibitors.

U.S. Pat. No. 7,241,391 discloses a formulation for prevention of scale deposits, which comprises biodegradable anticorrosion inhibitors and scale dispersants, which are to be used in purely water-conducting systems.

It was an object of the present invention to find heat transfer fluids which are readily biodegradable and are thus suitable for use in near-surface geothermal installations, and which ensure sufficient corrosion protection.

The invention therefore provides for the use of a triazole-free composition which, as well as water, comprises
a) 9.2 to 49.5% by weight of at least one $C_2$- to $C_3$-alkylene glycol, of a $C_2$- to $C_3$-polyalkylene glycol or glycerol,
b) 0.1 to 4% by weight of at least one corrosion inhibitor,
with the provisos that
c) the composition has good biodegradability (is "readily degradable") according to test method OECD 301 A,
d) the composition has an anaerobic biodegradability of at least 75% according to test method OECD 311,
e) the corrosion inhibitor or all corrosion inhibitors used have good biodegradability (are "readily degradable") according to OECD 301 A (for water-soluble corrosion inhibitors) or OECD 301 B (for sparingly water-soluble corrosion inhibitors), as a heat transfer fluid in near-surface geothermal installations.

The invention further provides a triazole-free heat transfer fluid for near-surface geothermal installations, comprising water and
a) 9.2 to 49.5% by weight of at least one $C_2$- to $C_3$-alkylene glycol, of a $C_2$- to $C_3$-polyalkylene glycol or glycerol,
b) 0.1 to 4% by weight of at least one corrosion inhibitor,
with the provisos that
c) the heat transfer fluid has good biodegradability (is "readily degradable") according to test method OECD 301 A,
d) the heat transfer fluid has an anaerobic biodegradability of at least 75% according to test method OECD 311,
e) the corrosion inhibitor or all corrosion inhibitors used have good biodegradability (are "readily degradable") according to OECD 301 A (for water-soluble corrosion inhibitors) or OECD 301 B (for sparingly water-soluble corrosion inhibitors).

The invention further provides a triazole-free heat transfer concentrate for the production of a heat transfer fluid, said concentrate comprising
a) 92.4 to 98.9% by weight of at least one $C_2$- to $C_3$-alkylene glycol, a $C_2$- to $C_3$-polyalkylene glycol or glycerol,
b) 1.1 to 7.6% by weight of at least one corrosion inhibitor,
with the provisos that
c) the heat transfer concentrate has good biodegradability (is "readily degradable") according to test method OECD 301 A,
d) the heat transfer concentrate has an anaerobic biodegradability of at least 75% according to test method OECD 311,
e) the corrosion inhibitor or all corrosion inhibitors used have good biodegradability (are "readily degradable") according to OECD 301 A (for water-soluble corrosion inhibitors) or OECD 301 B (for sparingly water-soluble corrosion inhibitors).

The invention further provides a process for operating a near-surface geothermal installation, in which the inventive heat transfer fluid brings about the transfer of thermal energy.

Preferably, constituents a) and b) each have good biodegradability alone.

The term "triazole-free" means that triazoles are not present in detectable amounts.

In the inventive use and the inventive heat transfer fluid, the proportion of water in a preferred embodiment is ad 100% by weight.

When the inventive heat transfer concentrate contains further constituents apart from component a) and component b), all individual components present in a concentration of >0.02% by weight meet the condition of biodegradability.

The biodegradability of the inventive composition and constituents thereof is determined according to the OECD Guidelines for Testing of Chemicals 301 and 311.

The inventive heat transfer concentrate and the inventive heat transfer fluid have good biodegradability (are "readily degradable") according to test method OECD 301 A in the version of Jul. 17, 1992. The test method OECD 301 A is applicable to the inventive heat transfer concentrate and the inventive heat transfer fluid since both are water-soluble. Good biodegradability is defined in point 10 of OECD 301.

The inventive heat transfer concentrate and the inventive heat transfer fluid, according to test method OECD 311 in the version dated Mar. 23, 2006, have an anaerobic biodegradability of at least 75%, preferably at least 80%.

The corrosion inhibitor or, if more than one corrosion inhibitor is used, all corrosion inhibitors used have good biodegradability (are "readily degradable") according to the respectively applicable test method OECD 301 A (for water-soluble corrosion inhibitors) or OECD 301 B (for sparingly water-soluble corrosion inhibitors), each in the version dated Jul. 17, 1992. Good biodegradability is defined in point 10 of OECD 301.

In a preferred embodiment, the inventive heat transfer concentrate or the inventive heat transfer fluid comprise sodium hydroxide solution or potassium hydroxide solution to establish a pH of 7.0 to 11.4, or this value is established in the course of the inventive use. This serves, for example, to neutralize any organic acids present, and as what is called reserve alkalinity, i.e. buffer capacity which prevents lowering of the pH due to oxidative glycol degradation products.

The proportion of constituent a) in the heat transfer concentrate is preferably between 92 and 97% by weight, especially between 93 and 95% by weight.

The proportion of corrosion inhibitor b) in the heat transfer concentrate is preferably between 2 and 7% by weight, especially between 5 and 7% by weight.

A particularly preferred embodiment of the invention is that of heat transfer fluids comprising
a) 20 to 40% by weight of at least one antifreeze additive selected from $C_2$- to $C_3$-alkylene glycol, $C_2$- to $C_3$-polyalkylene glycol and glycerol,
b) 0.2 to 3.2% by weight of at least one corrosion inhibitor and
c) 66.8 to 78.8% by weight of water
and the use thereof in near-surface geothermal installations.

Preferred corrosion inhibitors are alkali metal, alkaline earth metal or amine salts of a compound of the formula

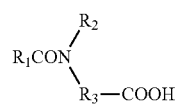

where
$R_1$ is branched $C_6$-$C_{13}$-alkyl, or $C_5$- or $C_6$-cycloalkyl or polycycloalkyl having 6 to 13 carbon atoms, which may be substituted by one or two $C_1$-$C_4$-alkyl groups,
$R_2$ is hydrogen or $C_1$-$C_6$-alkyl and
$R_3$ is $C_1$-$C_{11}$-alkylene in a straight or branched chain.

EXAMPLES

According to standard ASTM D 1384, the losses of material resulting from corrosion were tested for aqueous mixtures of the additives described. Since the use temperatures of the heat transfer are normally between −20° C. and +20° C. in near-surface geothermal installations, the ASTM D 1384 test was modified and a test temperature of +50° C. was used (according to ASTM D 1384, +88° C. is used). Otherwise, the test conditions were unchanged.

This involved immersing six different metals into the appropriate heat transfer and storing them at +50° C. in the presence of aggressive ions (e.g. chloride) and oxygen for two weeks. The loss of mass of the metals can be used to assess the corrosion protection.

The following corrosion inhibitors were used:
Inhibitor X:

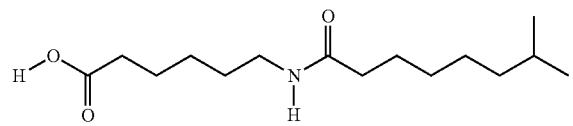 [SMILES: CC(C)CCCCCC(=O)NCCCCCC(=O)O]

Inhibitor A: isononanoic acid
Inhibitor B: 2-ethylhexanoic acid
Inhibitor C: sebacic acid
Inhibitor D: triethanolamine

TABLE 1

Biodegradability of the constituents of heat transfer fluids

| | Test method | De-gradability | Assessment of degradability | Source |
|---|---|---|---|---|
| 1,2-propylene glycol | OECD 301A | >70% | good | Manufacturer safety data sheet |
| Inhibitor X | OECD 301B | >90% (15 d) | good | Manufacturer safety data sheet |
| Inhibitor A | OECD 301B | approx. 63% (25 d) | moderately degradable | Manufacturer safety data sheet |
| Inhibitor B | OECD 301B | approx. 90% (25 d) | good | Manufacturer safety data sheet |
| Inhibitor C | OECD 301B | >80% (25 d) | good | In-house measurement |
| Inhibitor D | OECD 301A | >80% (25 d) | good | Manufacturer safety data sheet |
| Benzotriazole | 301D | 0% (28 d) | not degradable | Research report 200 24 233 |
| | 302B | 12% (28 d) | not degradable | UBA-FB 000298 |

TABLE 2

Heat transfer compositions

| | Example | | | | | |
|---|---|---|---|---|---|---|
| | 1 (C) | 2 | 3 (C) | 4 | 5 | 6 |
| ASTM water | 66.7 | 66.7 | 66.7 | 66.7 | 66.7 | 66.7 |
| 1,2-propylene glycol | 33.3 | 32.0 | 32.6 | 31.3 | 31.8 | 32.3 |
| Inhibitor X | — | 1.3 | — | — | — | — |
| Inhibitor A | — | — | 0.7 | — | — | — |
| Inhibitor B | — | — | — | 2.0 | — | — |

TABLE 2-continued

| | Heat transfer compositions | | | | | |
|---|---|---|---|---|---|---|
| | Example | | | | | |
| | 1 (C) | 2 | 3 (C) | 4 | 5 | 6 |
| Inhibitor C | — | — | — | — | 1.5 | — |
| Inhibitor D | — | — | — | — | — | 1.0 |
| Sum [%] | 100 | 100 | 100 | 100 | 100 | 100 |
| Degradability | good | good | good | good | good | good |

The following results were obtained for the corrosivity:

TABLE 3

Corrosion of metals in $g/m^2$, tested by modified
ASTM D 1384 (336 h/50° C., 6 l of air/h)

| | | Heat transfer from example | | | | | Limits to |
|---|---|---|---|---|---|---|---|
| | | 1 (C) | 2 | 3 (C) | 4 | 5 | 6 | ASTM D 3306* |
| Copper | (Cu) | −0.3 | −1.2 | −1.7 | −2.6 | −1.8 | −2.5 | −10 |
| Soft solder | (WL 30) | −123 | −6.0 | −0.7 | −5.5 | −10.8 | −8.8 | −30 |
| Brass | (MS 63) | −0.4 | −0.9 | −1.3 | −1.8 | −1.5 | −2.9 | −10 |
| Steel | (CK 22) | −88 | −0.3 | −0.8 | −2.8 | −0.6 | −1.5 | −10 |
| Cast iron | (GG 25) | −153 | −0.8 | −0.3 | −9.2 | −2.8 | −3.7 | −10 |
| Cast aluminum | ($AlSi_6Cu_3$) | −37 | −12 | −23 | −28 | −15 | −13 | −30 |

*Corrosion protection is good when the measured values are below the prescribed limits (to ASTM D3306).

The invention claimed is:

1. A process for operating a near-surface geothermal installation, comprising the step of bringing about the transfer of thermal energy with a triazole-free composition which, as well as water, comprises
   a) 9.2 to 49.5% by weight of at least one $C_2$- to $C_3$-alkylene glycol, of a $C_2$- to $C_3$-polyalkylene glycol or glycerol,
   b) 0.1 to 4% by weight of at least one corrosion inhibitor, in which the corrosion inhibitor is an alkali metal, alkaline earth metal or amine salt of a compound of the formula

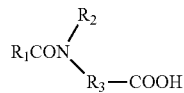

where
$R_1$ is branched $C_6$-$C_{13}$-alkyl, or $C_5$- or $C_6$-cycloalkyl or polycycloalkyl having 6 to 13 carbon atoms, which may be substituted by one or two $C_1$-$C_4$-alkyl groups,
$R_2$ is hydrogen or $C_1$-$C_6$-alkyl and
$R_3$ is $C_1$-$C_{11}$-alkylene in a straight or branched chain,
with the provisos that
   c) the composition has good biodegradability (is "readily degradable") according to test method OECD 301 A,
   d) the composition has an anaerobic biodegradability of at least 75% according to test method OECD 311,
   e) the corrosion inhibitor or all corrosion inhibitors used have good biodegradability (are "readily degradable") according to OECD 301 A (for water-soluble corrosion inhibitors) or OECD 301 B (for sparingly water-soluble corrosion inhibitors).

2. The process as claimed in claim 1, wherein the content of corrosion inhibitors is 2 to 7% by weight.

3. The process as claimed in claim 1 in which the pH is between 7.0 and 11.4.

4. A triazole-free heat transfer fluid for near-surface geothermal installations, comprising water and
   a) 9.2 to 49.5% by weight of at least one $C_2$- to $C_3$-alkylene glycol, $C_2$- to $C_3$-polyalkylene glycol or glycerol,
   b) 0.1 to 4% by weight of at least one corrosion inhibitor, in which the corrosion inhibitor is an alkali metal, alkaline earth metal or amine salt of a compound of the formula

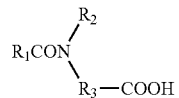

where
$R_1$ is branched $C_6$-$C_{13}$-alkyl, or $C_5$- or $C_6$-cycloalkyl or polycycloalkyl having 6 to 13 carbon atoms, which may be substituted by one or two $C_1$-$C_4$-alkyl groups,
$R_2$ is hydrogen or $C_1$-$C_6$-alkyl and
$R_3$ is $C_1$-$C_{11}$-alkylene in a straight or branched chain,
with the provisos that
   c) the heat transfer fluid is readily degradable according to test method OECD 301 A,
   d) the heat transfer fluid has an anaerobic biodegradability of at least 75% according to test method OECD 311,
   e) the corrosion inhibitor or all corrosion inhibitors used are readily degradable according to OECD 301 A for water-soluble corrosion inhibitors or OECD 301 B for sparingly water-soluble corrosion inhibitors.

5. The triazole-free heat transfer fluid as claimed in claim 4, comprising
   a) 20 to 40% by weight of at least one $C_2$- to $C_3$-alkylene glycol, $C_2$- to $C_3$-polyalkylene glycol or glycerol,
   b) 0.2 to 3.2% by weight of at least one corrosion inhibitor and
   c) 66.8 to 78.8% by weight of water.

6. A triazole-free heat transfer concentrate for the production of a heat transfer fluid, wherein the concentrate comprises
   a) 92.4 to 98.9% by weight of at least one $C_2$- to $C_3$-alkylene glycol, $C_2$- to $C_3$-polyalkylene glycol or glycerol,
   b) 1.1 to 7.6% by weight of at least one corrosion inhibitor, in which the corrosion inhibitor is an alkali metal, alkaline earth metal or amine salt of a compound of the formula

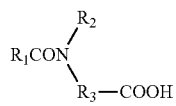

where
$R_1$ is branched $C_6$-$C_{13}$-alkyl, or $C_5$- or $C_6$-cycloalkyl or polycycloalkyl having 6 to 13 carbon atoms, which may be substituted by one or two $C_1$-$C_4$-alkyl groups,
$R_2$ is hydrogen or $C_1$-$C_6$-alkyl and
$R_3$ is $C_1$-$C_{11}$-alkylene in a straight or branched chain,
with the provisos that
   c) the heat transfer concentrate is readily degradable according to test method OECD 301 A,
   d) the heat transfer concentrate has an anaerobic biodegradability of at least 75% according to test method OECD 311,
   e) the corrosion inhibitor or all corrosion inhibitors used are readily degradable according to OECD 301 A for water-soluble corrosion inhibitors or OECD 301 B for sparingly water-soluble corrosion inhibitors.

\* \* \* \* \*